Jan. 13, 1959   S. UNTERMYER ET AL   2,868,706
DEVICE FOR CHARGING OR DISCHARGING
Filed April 12, 1954   5 Sheets-Sheet 1
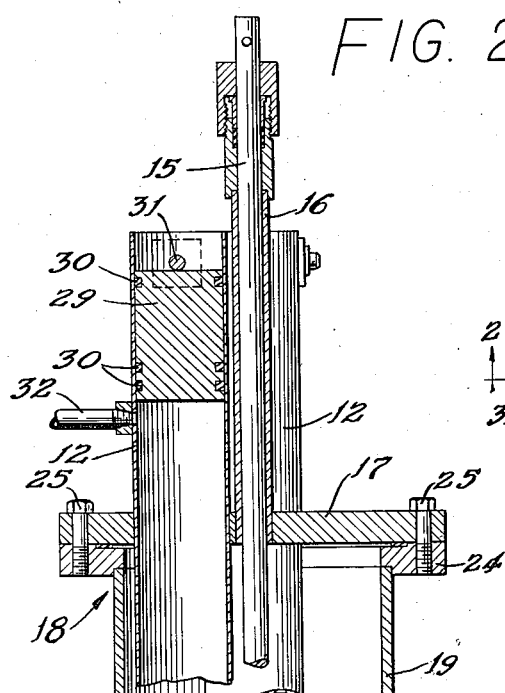
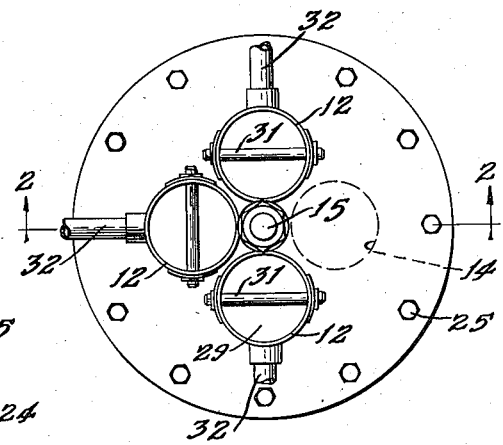
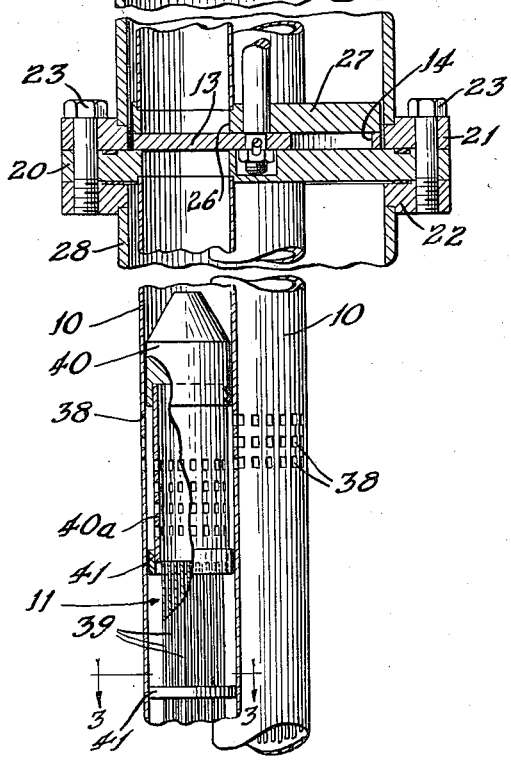
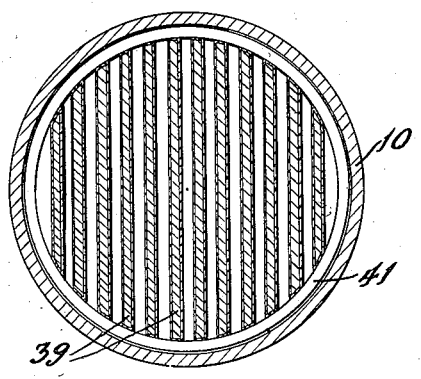
INVENTORS
Samuel Untermyer
Ernest Hutter
BY
ATTORNEY INVENTORS
Samuel Untermyer
Ernest Hutter

ATTORNEY

Jan. 13, 1959  S. UNTERMYER ET AL  2,868,706
DEVICE FOR CHARGING OR DISCHARGING
Filed April 12, 1954  5 Sheets-Sheet 4

INVENTORS
Samuel Untermyer
Ernest Hutter
BY
ATTORNEY

Jan. 13, 1959    S. UNTERMYER ET AL    2,868,706
DEVICE FOR CHARGING OR DISCHARGING
Filed April 12, 1954                    5 Sheets-Sheet 5

INVENTORS
Samuel Untermyer
Ernest Hutter
BY

ATTORNEY

United States Patent Office 2,868,706
Patented Jan. 13, 1959

2,868,706

DEVICE FOR CHARGING OR DISCHARGING

Samuel Untermyer, Downers Grove, and Ernest Hutter, Chicago, Ill., assignors to the United States of America as represented by the United States Atomic Energy Commission Application April 12, 1954, Serial No. 422,701

3 Claims. (Cl. 204—193.2)

This invention relates to a loading and unloading device and more particularly to a device for loading objects into, and unloading them from, an apparatus in which fluid under pressure is employed.

In apparatuses in which fluid under pressure is circulated in treating or cooling objects positioned within the apparatus, the pressure fluid complicates the loading and unloading of the objects. Frequently the apparatus is shut down at the time of loading and unloading in order that the loss of pressure fluid may be avoided as much as possible. Under certain circumstances it may be desirable or necessary to continue the operation of the apparatus during loading and unloading. Accordingly, we have invented a device that will load objects into, and unload them from, an apparatus during the time that fluid under pressure is being circulated therein.

In the drawings:

Fig. 1 is a plan view of the loading and unloading device of the present invention;

Fig. 2 is a vertical section taken on the line 2—2 of Fig. 1 and showing the device and also tubes of the apparatus to which the device is applied and an object to be unloaded;

Fig. 3 is a horizontal sectional view through the tube and the object, taken on the line 3—3 of Fig. 2;

Figure 9:
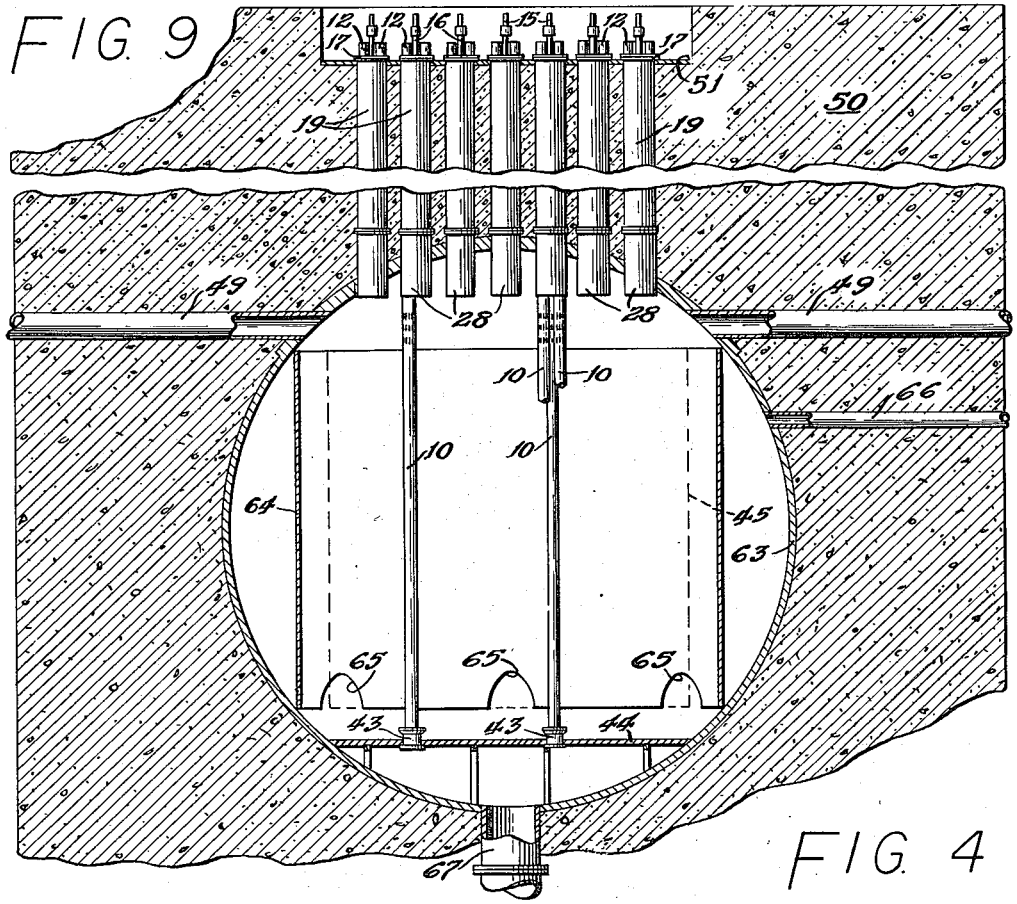
Fig. 9 is a vertical sectional view showing an alternate form of the complete apparatus.

Reference is made to Figs. 1–4 for a showing of the novel device of the present invention. As shown in Fig. 2, the device is applied to a plurality of tubes 10 in which objects 11 are subjected to pressure fluid being circulated through the tubes. The device includes a plurality of tubular extensions 12, which are so termed because they are aligned with and extend from beyond the ends of the tubes 10. In the embodiment illustrated the tubes 10 are three in number and are arranged so that their axes are parallel and intersect an imaginary plane normal thereto at three points that lie on a circle, two of the points being spaced about 90 degrees from the third point and about 180 degrees from one another. The extensions 12, being aligned with the tubes 10, are also three in number, and the axes of the extensions are arranged similarly to those of the tubes. The device also includes a valve disk 13 which lies between the tubes and the extensions and has an opening 14 which may be aligned successively with each tube 10 and the associated extension 12 so as to provide communication therebetween or may be positioned as shown in Figs. 1 and 2 on the diametrically opposite side of the circle intersecting the tube axes from the middle tube 10 so that all tubes 10 are shut off from their extensions. The aforementioned shifting of the valve opening 14 is accomplished by rotational movement of the valve disk 13 about an axis parallel to the tube axes and passing through the center of the circle intersecting the tube axes.

The valve disk 13 is mounted for the aforesaid rotational movement by means of a rod 15 and a sleeve 16. The lower end of the rod is secured to the valve disk 13 and an upper portion of the rod is journaled in the sleeve 16. The sleeve has one end secured to, and extends upwardly from, an end member 17, which forms part of a casing 18, which contains and supports the tubular extensions 12. The casing 18 also comprises a shell 19 and a lower end member 20, which is secured by welding to the ends of the tubes 10 and upon which the valve disk 13 rests. Upper and lower rings 21 and 22 are secured by screws 23 to the top and bottom of the lower end member 20 and are sealed thereto. The lower end of the shell 19 is secured by welding to the upper ring 21, and the upper end is secured by welding to a ring 24 secured by screws 25 to the under side of the upper end member 17 and sealed thereto.

Upper portions of the tubular extensions 12 project through and beyond the upper end member 17 and are secured thereto by welding. The lower ends of the tubular extensions are secured by welding in openings 26 in a plate 27 which engages the top of the valve disk 13 to hold it against the lower end member 20. A cylinder 28 is secured by welding to the under side of the lower ring 22 and depends therefrom so as to surround the upper portions of the tubes 10.

Figure 4:
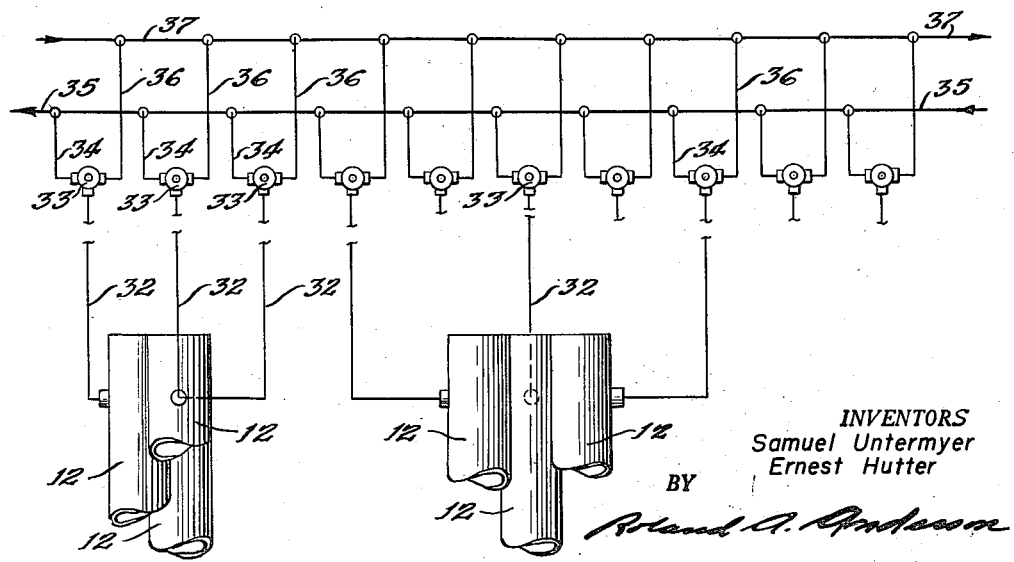
Fig. 4 is a schematic view showing how a plurality of devices of the present invention is connected with a source of pressure fluid and drain.

Removable plugs 29 located in the upper ends of the tubular extensions 12 close the same. Seals 30 provided in annular grooves formed in plugs 29 help the plugs to seal the upper ends of the tube. A removable pin 31 inserted crosswise through the wall of each tubular extension 12 above the plug 29 therein prevents the plug from being forced out of the upper end of the tubular extension by pressure fluid. A fluid line 32 is connected to each tubular extension 12 and as shown in Fig. 4 is connected to a valve 33, which may connect the line 32 either to a line 34 connected with a drain line 35 or to a line 36 connected to a pressure line 37 tied to a source of fluid under pressure, not shown, or may provide no outlet from the line 32 through the valve 33 by being connected with neither line 34 nor line 36.

It is contemplated that fluid under pressure will be supplied continuously to the tubes 10 through their lower ends. Such fluid will exit from the upper regions of the tubes through three sets of openings 38 ringing the tubes. Each object 11, which is subjected to the circulating pressure fluid in one tube 10, comprises a set of spaced parallel plates 39 extending lengthwise of the tube 10, a piston head 40 having a slightly loose fit in the tube, and a perforated skirt 40a extending between the piston and the plates.

The skirt 40a is secured at one end to the piston and at the other end to the uppermost of a plurality of rings 41, which is secured to the upper ends of the plates 39. The rings 41 extend about the plates 39 and are secured thereto so as to hold them in suitable spaced relation. The rings 41 have a sliding fit in the tube 10. The lower ends of the objects 11 are supported in a manner not shown in Figs. 1–4.

Normally the valve disk 13 is positioned with respect to the tubes 10 as shown in Figs. 1 and 2, i. e., the opening 14 of the valve disk being out of registry with the tubes 10 about midway between the end tubes and diametrically opposite the middle tube. In this position the valve disk 13 closes the upper ends of the tubes 10. When an object 11 is to be removed from a particular tube 10, the associated extension 12 is supplied with pressure fluid through the associated lines 32, 36, and 37 and valve 33 with the source of pressure fluid, so that the fluid pressure on both sides of the valve disk is more or less equalized. Now the valve disk 13 is rotated to bring the opening 14 into alignment with the particular tube. Now the valve 33 is switched from the pressure source to drain, and the pressure fluid in tube 10 forces the object 11 into the associated extension 12. Thereafter the valve disk 13 is rotated to close the tube 10. Now the object 11 may be removed through the top of the extension 12 after removal of the plug 29.

A new object 11 may be placed in the extension 12, and the plug 29 is replaced. Next the extension is connected with the source of pressure fluid by manipulation of the valve 33. When the pressure of the fluid in the extension 12 is equal to that in the tube 10, the valve disk 13 is rotated to align the opening 14 with the tube and the extension. Now the pressure of the fluid supplied through the line 32 is increased above the fluid pressure in the tube 10, and thus the object 11 is forced down into the tube 10. After the object 11 has reached its lowermost position as shown in Fig. 2, the valve disk 13 is rotated to shut off the tube 10 from the extension 12. Now the fluid pressure in the extension 12 may be reduced by suitable manipulation of the associated valve 33.

In similar fashion the objects 11 may be removed from the other two tubes 10 of the group and replaced by new objects 11. Similar operations may be carried out on the other tube groups to remove the objects 11 therefrom and replace them with new objects. There is no interruption of operation of the apparatus of which the sets of tubes 10 form an important part; fluid under pressure continues to flow through the tubes at all times, entering through the lower ends, flowing over and between the plates 39, and exiting near the upper ends of the tubes through the ports 38. This flow of fluid goes on during the time in which an object 11 is being removed and replaced and occurs in all the tubes.

Figure 5:
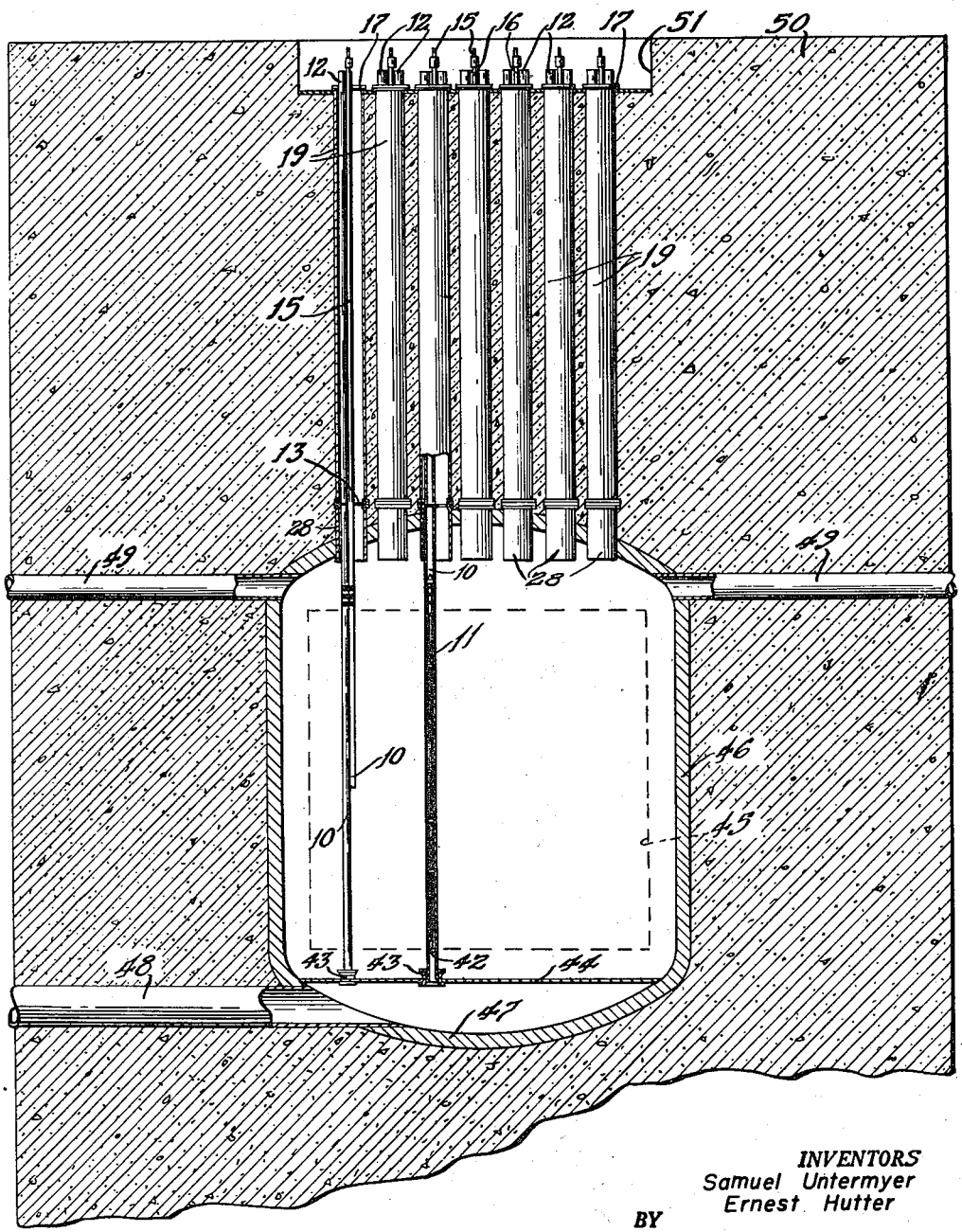
Fig. 5 is a vertical sectional view showing one form of the complete apparatus to which the device of the present invention is applied.

More specifically, each object 11 is a fuel element for a neutronic reactor and will hereafter be referred to as such. In each fuel element there are twelve plates 39, each of which is 13 feet long and is formed of a core of natural uranium .140 inch thick and a covering or coating of zirconium .010 inch thick on each side and end. The plates 39 are spaced .213 inch from one another. Each plate is of uniform width throughout its length, but the plates vary in width with respect to one another, the two widest plates at the center being 4.75 inches in width. If the plates 39 are made of smaller plates welded end to end, the joints in each plate should be staggered with respect to the joints in the other plates. Each tube 10 is zirconium, has an internal diameter of 5 inches, and, as shown in Fig. 5, has near its lower end an internal annular ridge or abutment 42 which supports the fuel element 11 in the tube by engaging the lowermost ring 41 on the lower ends of the plates 39. Each tube is supported in a fitting 43 secured in a plate 44, both being formed of zirconium.

Figure 8:
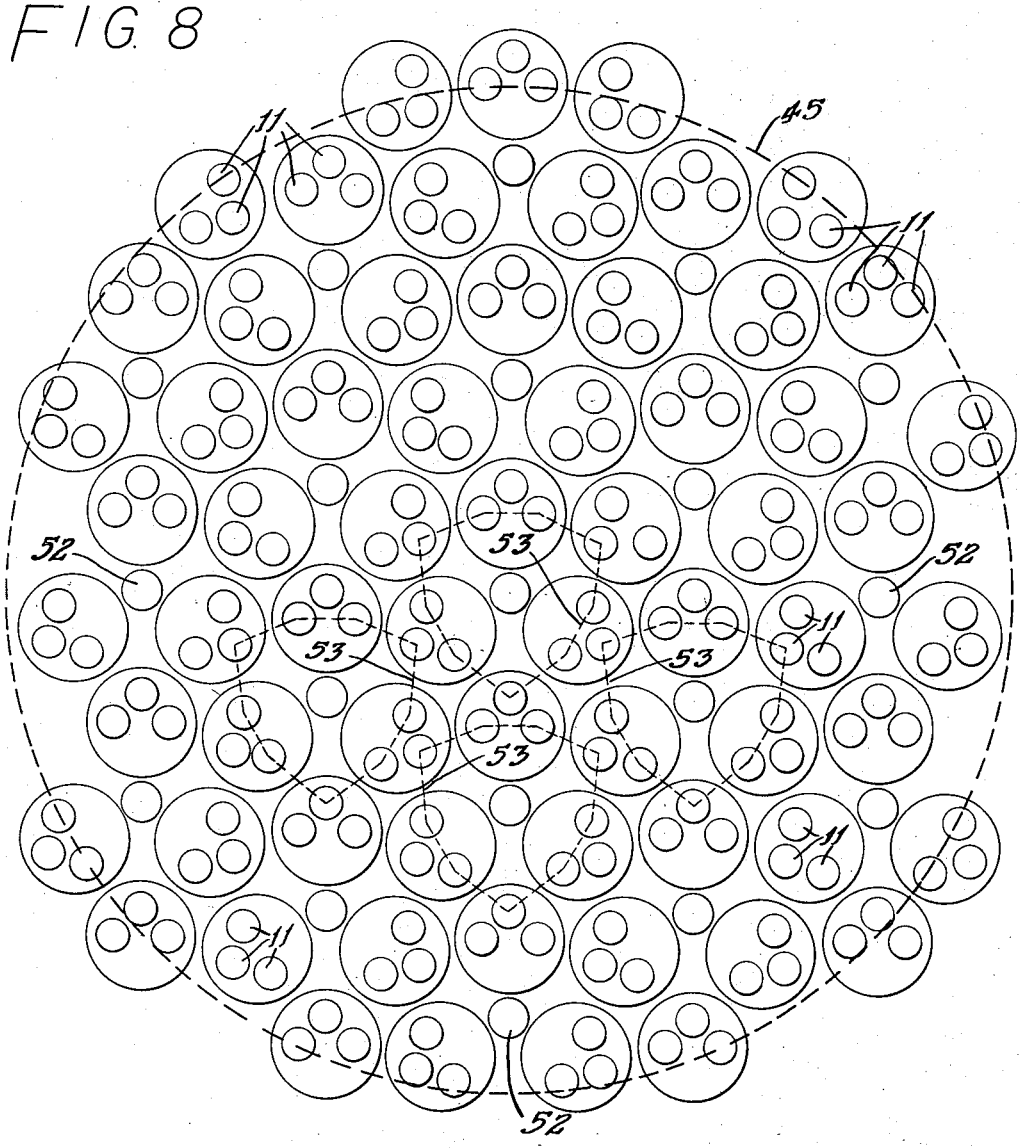
Fig. 8 is a schematic plan view showing an arrangement of fuel elements and control rods of a neutronic reactor.

There are 195 fuel elements 11 arranged in groups of threes as indicated in Fig. 8. There are 195 tubes in which the fuel elements 11 are mounted. Thus there are 65 groups of fuel elements 11 and 65 groups of tubes 10. The 195 fuel elements 11 together with liquid moderator in the form of heavy water surrounding the tubes 10 comprise an active reactor portion 45 which is a right cylinder in shape, 13 feet long and 13 feet in diameter, which is shown in dotted lines in Figs. 5 and 8. Since, as shown in Fig. 8, some of the fuel elements 11 are partially outside of the 13-foot circle 45, the active portion is actually greater than 13 feet in diameter at certain regions, but since at other regions the outermost fuel elements are somewhat within the 13-foot circle, the average diameter of the active portion is about 13 feet. The reactor is contained in a stainless-steel pressure vessel 46 which has circular cylindrical sides and a 15-foot internal diameter. The sides are spaced 1 foot from the active portion 45 so as to provide a cylindrical annulus 1 foot thick in which heavy water provides a reflector for the active portion. The vessel 46 has a base 47 which together with the plate 44 provides an inlet plenum chamber for heavy water coming from an inlet conduit 48 to the fuel elements 11 in the tubes 10. The vessel 46 rises above the action portion 45 and has two outlet conduits 49 which are at about the level of the ports 38 in the tubes 10 so that the heavy water flowing up through the tubes 10 and over the plates 39 may leave the tubes through the ports 38 and the vessel 46 through the conduits 49. The heavy water coming out of the ports 38 mixes with heavy water surrounding the tubes 10 before leaving the vessel 46. The vessel 46 contains 78 tons of heavy water at 600 p. s. i. a.

The upper end of the vessel 46 has openings in which the 65 cylinders 28 are mounted. These cylinders and the 65 shells 19 forming part of 65 casings 18 extend through the upper portion of a concrete shield 50 in which the shell 46 is completely embedded, said upper portion of the shield being 18 feet thick. The shield 50 has a recess or depression 51 into which the portions of the tubes 12 above the end plate 17, the bearing sleeves 16, and the upper ends of the regulating rods 15 project.

Placed among the 195 fuel elements 11 are 19 control rods 52 which, as shown in Fig. 8, are arranged in a diamond pattern of which each side and the shorter diagonal is 33 inches long. Thus each of the control rods at the ends of the shorter diagonal has a centerline-to-centerline spacing of 33 inches from each of the other control rods of the diamond, and the control rods at the ends of the longer diagonal of the diamond are spaced $33\sqrt{3}$ or 57.156 inches from one another. Considered in another way, the control rods 52 are arranged on the pattern of equilateral triangles each side of which is 33 inches long. The fuel elements 11 are arranged around the control rods 52 so that at the intersection of the long and short diagonals of each diamond is located that middle fuel element 11 of a group of three fuel elements which lies somewhat between the other two or has a 90 degree spacing from the other two when considered with respect to the circle on the center of which the valve disk 13 rotates. Thus each middle fuel element 11 has a centerline-to-centerline spacing of 16.5 inches from two control rods 52 and a centerline-to-centerline spacing of $16.5 \times \sqrt{3}$ or 28.578 inches from two other control rods 52. The remaining two, or outer, fuel elements 11 are spaced the same amount from the shorter diagonal of the diamond on which the middle fuel element lies. The outer fuel elements have centerline-to-centerline spacings of 6 inches from the associated middle fuel element and a centerline-to-centerline spacing of $6\sqrt{2}$ or 8.484 inches from one another. Each of the outer fuel elements has its centerline spaced $3\sqrt{2}$ or 4.242 inches from the shorter diagonal of the diamond on which the associated middle fuel element lies. Each control rod 52, except certain of the outermost ones, may be considered to lie at the center of an equilateral triangle having the centerline of the middle fuel elements 11 of three groups of fuel elements at its corners. The outer fuel elements 11 of three other groups of fuel elements lie somewhat outward of the sides of this equilateral triangle so as to be located on the sides of certain quasi-triangular shapes 53 shown in dotted lines in Fig. 8, each of which is equilateral in character and has outwardly bowed or convex sides. The middle fuel elements of three groups lie on the corners of each quasi-triangular shape, and the outer fuel elements of three other groups lie on the bowed sides of said shape. The middle fuel elements 11 at the corners have a centerline-to-centerline spacing of 16.5 inches from the control rod 52 within the triangular shape, and the outer fuel elements 11 on the bowed sides have a centerline-to-centerline spacing of 12.95 inches from the control rod within the triangular shape. The arrangement of control rods 52 and fuel elements 11 is as aforesaid except that the control rods 52 will not be distributed among the fuel elements 11 all the way to the peripheral regions of the active zone 45.

Figure 6:
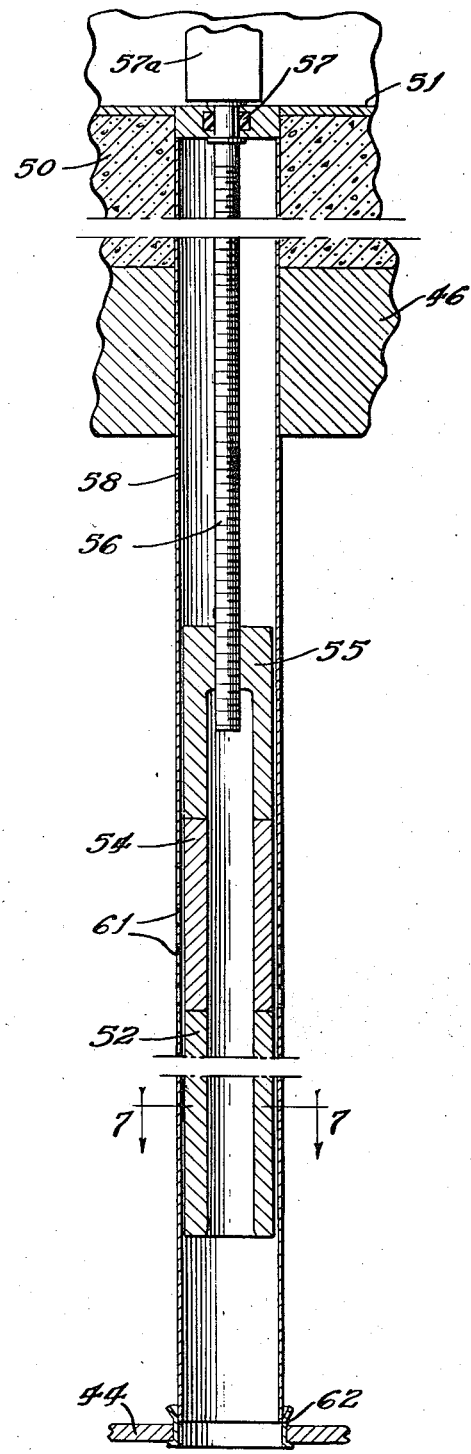
Fig. 6 is a vertical sectional view taken through a control rod and associated parts.
Figure 7:
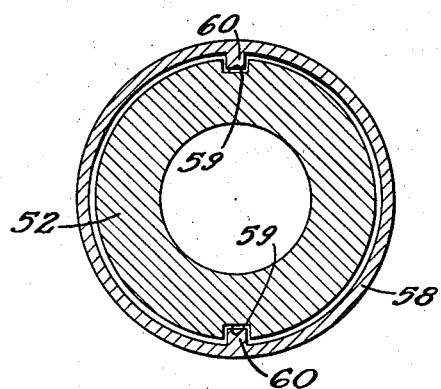
Fig. 7 is a horizontal sectional view taken on the line 7—7 of Fig. 6.

As shown in Figs. 6 and 7, each control rod 52 is formed of thorium, is 13 feet long, and has an inner diameter of 6 inches and an outer diameter of 3 inches. Attached to the upper end of the control rod is a zirconium tubular section 54 which is 1 foot long and has an internal diameter of 3 inches and an external diameter of 6 inches. Attached to the upper end of each section 54 is a stainless-steel tubular section 55 which is 1-foot long and has an external diameter of 6 inches and an internal diameter of 3 inches, except for an upper portion which has a threaded opening which is somewhat less than 3 inches in diameter and is engaged by a stainless-steel screw 56. The screw projects upwardly through the portion of the shield 50 above the reactor through a seal 57 to a connection with a motor 57a, which rotates the screw 56 to cause the same to lift and lower the control rod 52. The motor is positioned in the depression 51 formed in the shield 50. Each control rod 52 is slidably mounted in a zirconium tube 58 which is 6.10 inches in internal diameter and .060 inch in wall thickness and extends from the bottom plate 44 up through the active portion 45 through the shield 50 to the seal 57. The length of each tube 58 should be 30 feet or a little more so that the 13-foot control rod 52 along with the tubular extensions 54 and 55 at the top thereof can be raised 15 feet by rotation of the screw 56, with the result that with the control rod 52 fully withdrawn from the active portion 45 of the reactor it is at least 2 feet above the top of the active portion.

Diametrically opposed longitudinal grooves 59 formed on the exterior of each control rod 52 and diametrically opposed internal longitudinal ribs 60 on the tube 58 which are received in the grooves 59 prevent the rod 52 from rotating when the screw 56 is rotating and thus assure that rotation of the screw will move the rod 52 up and down. The grooves 59 are .253-inch wide and .253-inch deep. The ribs 60 are .250-inch high and .250-inch wide. The .050-inch clearance between each rod 52 and the associated tube 58, except at the grooves 59 and ribs 60, provides space through which heavy water may flow to cool the rod 52, the coolant being received from the inlet plenum chamber formed between the plate 44 and the base of the vessel 46 through the lower ends of the rod 52 and the tube 58 and exiting through ports 61 at intermediate regions of the tubes 58 at the level of the outlet conduits 49. The tubes 58 are mounted on the plate 44 in hollow open fittings 62 which permit the heavy water access to the lower ends of the rods 52 and the tubes 58. Heavy water also goes up in the interior of the tubes 52, because the screws 56 are not sealed in the stainless-steel sections 55, with which they have threaded engagement.

The amounts of uranium, heavy water and zirconium in the active portion of the reactor in the tubes 10 and fuel elements 11 are in the following proportions:

1 atom uranium
1.7 molecules $D_2O$
0.14 atom zirconium coating
0.04 atom zirconium tubing The following conditions will prevail at 1100 M. W. heat (240 M. W. electric) output:

Average heat flux in reactor: 208,000 B. t. u./sq. ft./hr. (16 cal./cm.²/sec.)
Maximum heat flux in reactor: 400,000 B. t. u./sq. ft./hr. (30 cal./cm.²/sec.)
Average coolant temperature rise: 57° F. (32° C.)
Coolant flow: 117,000 G. P. M.
Bulk moderator pressure: 600 p. s. i. a.
Heavy water from pile: 425° F. (218° C.)
Coolant velocity: 25 F. P. S.
Pressure drop through fuel elements: 45 p. s. i.
Net plant electric output: 240,000 kw.

The following materials are required for initial operation of this reactor:

Heavy water in tank: 91 tons (cold), 78 tons (hot)
Estimated total heavy water: 200 tons
Uranium (per charge): 62 tons
Zirconium tubes: 2.9 tons
Zirconium coating or covering: 5 tons It is contemplated that the increase in temperature of the heavy water flowing through the reactor will be used to heat water in a boiler to produce steam that will drive a turbine that will drive a generator of electric power.

When in the operation of the reactor there is substantial change in the plates 39 of the fuel elements 11 so that the power output of the reactor is materially reduced and the replacement of the fuel elements 11 becomes necessary, the mechanism disclosed in detail with reference to Figs. 1 and 2 is put into use.

The reactor of Fig. 9 differs from that of Fig. 5 in that a spherical pressure vessel 63 of stainless steel and a stainless steel cylindrical shell 64 are employed. The shell 64 is mounted within the vessel 63 and has a 15-foot internal diameter. The annular space between the vessel 63 and the shell 64 is an expansion space for heavy water coming from the inside of the shell 64 through recesses 65 in the lower edge of the shell. Helium is supplied under pressure of 600 p. s. i. a. through a supply pipe 66 against the heavy water in the expansion space. An inlet 67 for heavy water rises vertically beneath the shell 64 to the plenum chamber at the base of the shell 64.

In the foregoing description of a specific neutronic reactor using the present invention, various amounts and dimensions have been given merely by way of illustration. Wide variation using natural uranium can be made in accordance with the theory of neutronic reactors disclosed and claimed in copending application, Serial No. 568,904, filed December 19, 1944, by Enrico Fermi and Leo Szilard and issued as U. S. Patent No. 2,708,656 on May 17, 1955. Of course, $U^{235}$-enriched uranium or enrichment with $U^{233}$, $Pu^{239}$ or other isotope fissionable by neutrons and thermal energy can be used. Such fissionable isotopes alloyed with materials other than $U^{238}$ can be used.

It will be understood that this invention is not to be limited to the details given herein but that it may be modified within the scope of the appended claims.

What is claimed is:

1. In combination, three parallel tubes having their axes intersecting a plane normal thereto at three points lying in a circle, one point being spaced about 90 degrees from the other two, the other two points being spaced about 180 degrees from one another, said tubes being adapted to contain a first pressure fluid for treating objects therein, three parallel tubular extensions aligned with the tubes in spaced relationship thereto, a casing having a first end member attached to the ends of the tubes adjacent the extensions and a second end member attached to portions of the extensions spaced from the said ends thereof, a valve disk rotatably mounted in the casing at the first end member on an axis normal to said plane and passing through the center of said circle, the valve disk having an opening alignable with each tube upon appropriate rotation of the valve disk, removable plugs positioned in the ends of the extensions remote from the tubes, a regulating rod for the valve disk having one end secured thereto and projecting through the said second end member of the casing and beyond the ends of the extensions containing the removable plugs, a sleeve secured to the said second end member of the casing and projecting outwardly of the casing, the regulating rod being journaled in the sleeve, fluid lines connected to the extensions between the removable plugs and the said second end member of the casing, a drain line connectable with the fluid lines, whereby in one position of the valve disk the opening lies on the diametrically opposite side of the circle from the said one point so that the valve disk blocks off all the tubes from the extensions, in three other positions the opening is successively aligned with each tube so as to let it discharge an object therefrom by the first pressure fluid into the associated extension when the fluid line connected with said associated extension is connected to the drain line, and the plug is removed from the associated extension to permit removal of the object therefrom after the valve disk is angularly shifted to shut off the tube from its associated extension, and a pressure line connectable with the fluid line on the said associated extension for supplying thereto a second pressure fluid whereby a new object to be treated in the said tube may be placed in the said associated extension and forced into the said tube by the second pressure fluid coming through the fluid line from said pressure line after the removable plug is replaced and the valve disk is angularly shifted to align its opening with the said tube.

2. In combination, a plurality of parallel tubes having their axes intersecting a plane normal thereto at a plurality of points lying in an arcuate row, each point having about equal spacing from the adjacent point, except for the two points at the ends of the row which have a considerably greater spacing from one another, said tubes being adapted to contain a first pressure fluid for treating objects therein, a plurality of parallel tubular extensions aligned with the tubes in spaced relation thereto, a casing having a first end member attached to the ends of the tubes adjacent the extensions and a second end member attached to portions of the extensions spaced from the said ends thereof, a valve disk having an opening and mounted in the casing at the first end member for angular movement about an axis normal to said plane and passing through the center of said arcuate row, removable plugs positioned in the ends of the extensions remote from the tubes, a regulating rod for the valve disk having one end secured thereto and projecting through the second end member of the casing and beyond the ends of the extensions containing the removable plugs, a sleeve secured to the second end member of the casing and projecting outwardly of the casing, the regulating rod being journaled in the sleeve, fluid lines connected to the extensions between the removable plugs and the second end member of the casing, a drain line connectable with the fluid lines, whereby in one position of the valve disk the opening lies to the side of the center opposite the arcuate row so that the valve disk blocks off all the tubes from the extensions, and in a plurality of other positions corresponding to the number of tubes the opening is successively aligned with each tube so as to let it discharge an object therefrom by the first pressure fluid into the associated extension when the fluid line connected with said associated extension is connected to the drain line, and the plug is removed from the associated extension to permit the removal of the object therein after the valve disk is angularly shifted to shut off the tube from its associated extension, and a pressure line connectable with the fluid line on the said associated extension for supplying thereto a second pressure fluid, whereby a new object to be treated in the said tube may be placed in the said associated extension and forced into said tube by the second pressure fluid coming through the fluid line from said pressure line after the removable plug is replaced and the valve disk is angularly shifted to align its opening with the said tube.

3. In combination, a plurality of tubes arranged in side-by-side relation with their axes intersecting a plane at a plurality of points lying in an arcuate row, said tubes being adapted to contain a first pressure fluid for treating objects therein, a plurality of tubular extensions having ends adjacent to and aligned with ends of the tube, the points at the ends of the row being relatively widely spaced from one another, each point, except the end points, being about equally spaced from the two adjacent points, a valve disk having an opening and being positioned between said ends of the tubes and said ends of the extensions, means mounting the valve disk for angular movement to bring said opening successively into alignment with the adjacent end of each tube and the adjacent end of the associated extension, removable plugs positioned in the ends of the extensions remote from the tubes, fluid lines connected to the extensions between the removable plugs and the ends of the extensions adjacent the tubes, a drain line connectable with the fluid lines, whereby in one position of the valve disk the opening lies to the side of the center opposite the arcuate row so that the valve disk blocks off all the tubes from the extensions and in a plurality of other positions corresponding to the number of tubes the opening is successively aligned with each tube so as to let it discharge an object therefrom by the first pressure fluid into the associated extension when the fluid connected with said associated extension is connected to the drain line, and the plug is removed from the associated extension to permit removal of the object therefrom after the valve disk is angularly shifted to shut off the tube from its associated extension, and a pressure line connectable with the fluid line on the said associated extension for supplying thereto a second pressure fluid whereby a new object to be treated in the said tube may be placed in the said associated extension and forced into the said tube, the second pressure fluid coming through the fluid line from said pressure line after the removable plug is replaced and the valve disk is angularly shifted to align its opening with the said tube.

References Cited in the file of this patent

UNITED STATES PATENTS

| | | |
|---|---|---|
| 154,585 | Cole et al. | Sept. 1, 1874 |
| 1,813,100 | Swindle | July 7, 1931 |
| 2,104,514 | Galvin | Jan. 4, 1938 |
| 2,113,398 | Dalton | Apr. 5, 1938 |
| 2,214,194 | Frankley | Sept. 10, 1940 |
| 2,246,654 | Arveson | June 24, 1941 |

FOREIGN PATENTS

| | | |
|---|---|---|
| 19,960 | Denmark | Mar. 2, 1915 |
| 541,820 | Germany | Jan. 18, 1932 |